United States Patent
Chen et al.

(10) Patent No.: US 12,499,000 B2
(45) Date of Patent: Dec. 16, 2025

(54) FUNCTIONAL METADATA SYSTEM AND METHOD FOR DATA QUALITY INSPECTION

(71) Applicants: Inventec (Pudong) Technology Corporation, Shanghai (CN); INVENTEC CORPORATION, Taipei (TW)

(72) Inventors: Wei-Chao Chen, Taipei (TW); Shu-Huei Yang, Taipei (TW); Yu-Lun Chang, Taipei (TW)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 18/733,861

(22) Filed: Jun. 5, 2024

(65) Prior Publication Data

US 2025/0284577 A1   Sep. 11, 2025

(30) Foreign Application Priority Data

Mar. 5, 2024   (CN) .......................... 202410252031.X

(51) Int. Cl.
  *G06F 11/00*   (2006.01)
  *G06F 11/07*   (2006.01)
(52) U.S. Cl.
  CPC .................. *G06F 11/0751* (2013.01)
(58) Field of Classification Search
  CPC .................................. G06F 11/0751
  USPC ........................................... 714/1–57
  See application file for complete search history.

(56) References Cited

U.S. PATENT DOCUMENTS

| | | | |
|---|---|---|---|
| 11,669,382 B2* | 6/2023 | Leverich ............. | G06F 11/0793 714/37 |
| 2007/0061617 A1* | 3/2007 | Fujibayashi ........ | G06F 11/2082 714/6.1 |
| 2012/0144242 A1* | 6/2012 | Vichare ................ | G06F 11/076 714/39 |
| 2019/0155822 A1* | 5/2019 | Shkapenyuk ......... | G06F 16/285 |
| 2020/0250475 A1* | 8/2020 | Ikeda .................... | G06N 3/088 |
| 2021/0117232 A1* | 4/2021 | Sriharsha ............... | G06F 9/544 |
| 2022/0188280 A1* | 6/2022 | Bakhov ............... | G06F 11/3079 |
| 2022/0276920 A1* | 9/2022 | Martin ................ | G06F 11/0793 |
| 2022/0283996 A1* | 9/2022 | Lecaillon ............ | G06F 11/3428 |
| 2024/0089275 A1* | 3/2024 | An ....................... | H04L 63/1425 |
| 2024/0257544 A1* | 8/2024 | Takano ................ | G06V 10/987 |
| 2024/0330151 A1* | 10/2024 | Williams ................ | H04L 63/20 |

* cited by examiner

*Primary Examiner* — Sarai E Butler
(74) *Attorney, Agent, or Firm* — CKC & Partners Co., LLC

(57) ABSTRACT

The present disclosure provides a functional metadata method for data quality inspection, which includes steps as follows. Based on historical data, the functional metadata is established, where the functional metadata includes an acceptable pattern, a data distribution and a data definition; according to the functional metadata, at least one of a detection of the acceptable pattern, a detection of the data distribution and a detection of the data definition is performed on a data content, so as to obtain a detection result.

7 Claims, 2 Drawing Sheets

FUNCTIONAL METADATA SYSTEM AND METHOD FOR DATA QUALITY INSPECTION

RELATED APPLICATION

This application claims priority to China Patent Application No. 202410252031.X, filed Mar. 5, 2024, the entirety of which is herein incorporated by reference.

BACKGROUND

Field of Invention

The present invention relates to computer systems and operation methods, and more particularly, functional metadata systems and methods for data quality inspection.

Description of Related Art

Data quality is crucial. It relates to all kinds of applications, including infographics, data mining, business analytics, or training machine learning models. However, the defective data could cause inaccurate data statistics, or dangling feature dimensions.

In view of the foregoing, there still exist some problems of controlling the data quality that await further improvement. However, those skilled in the art sought vainly for a solution. Accordingly, there is an urgent need in the related field to solve or circumvent above problems and disadvantages.

SUMMARY

In one or more various aspects, the present disclosure is directed to functional metadata systems and methods for data quality inspection, to solve or circumvent above problems and disadvantages.

Some embodiments of the present disclosure are related to a functional metadata system for a data quality inspection, which includes a storage device and a processor. The storage device is configured to store data content. The processor is electrically connected to the storage device, the processor is configured to perform the data quality inspection on the data content to obtain a detection result, and the data quality inspection is selected from a group consisting of a detection of an acceptable pattern, a detection of a data distribution and a detection of a data definition.

In some embodiments of the present disclosure, the data content includes string content, and the processor detects whether a format of the string content matches the acceptable pattern.

In some embodiments of the present disclosure, the data content includes numeric content, and the processor performs the data distribution based on a historical data so as to define a default reasonable range for the numeric content.

In some embodiments of the present disclosure, the data content includes string content, and the processor determines whether the string content matches a predefined attribute in the data definition.

In some embodiments of the present disclosure, the data content includes numeric content, and the processor determines whether the numeric content is abnormal based on a default common sense standard.

Some embodiments of the present disclosure are related to a functional metadata method for a data quality inspection includes steps of: creating a functional metadata based on historical data, the functional metadata comprises an acceptable pattern, a data distribution and a data definition; and performing at least one of a detection of the acceptable pattern, a detection of the data distribution and a detection of the data definition on a data content according to the functional metadata, so as to obtain a detection result.

In some embodiments of the present disclosure, the data content includes numeric content, and the step of performing the detection of the data distribution on the data content includes: performing a data fitting on the historical data in advance to obtain a probability distribution of the historical data so as to analyze whether the numeric content is an abnormal value.

In some embodiments of the present disclosure, the data content includes string content, and the step of performing the detection of the acceptable pattern on the data content comprises: analyzing a format of the string content through an artificial intelligence model, and then detecting whether the format of the string content matches the acceptable pattern.

In some embodiments of the present disclosure, the step of performing the detection of the data definition on the data content includes: when the format of the string content does not match the acceptable pattern, using the artificial intelligence model to determine whether the format of the string content conforms to the default standard answer of the data definition, as a basis of confirming a correctness of the string content.

In some embodiments of the present disclosure, the data content includes a numeric content, and the step of performing the detection of the data definition on the data content includes: defining a predetermined numerical boundary of a default category based on a default common sense standard; and when the numeric content belongs to the default category, determining whether the numeric content exceeds the predetermined numerical boundary.

Technical advantages are generally achieved, by embodiments of the present disclosure. Through the functional metadata system and method for data quality inspection of the present disclosure, the problems and disadvantages in the conventional art are solved, thereby reducing the possibility of errors and saving time and manual inspection costs.

Many of the attendant features will be more readily appreciated, as the same becomes better understood by reference to the following detailed description considered in connection with the accompanying drawings.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
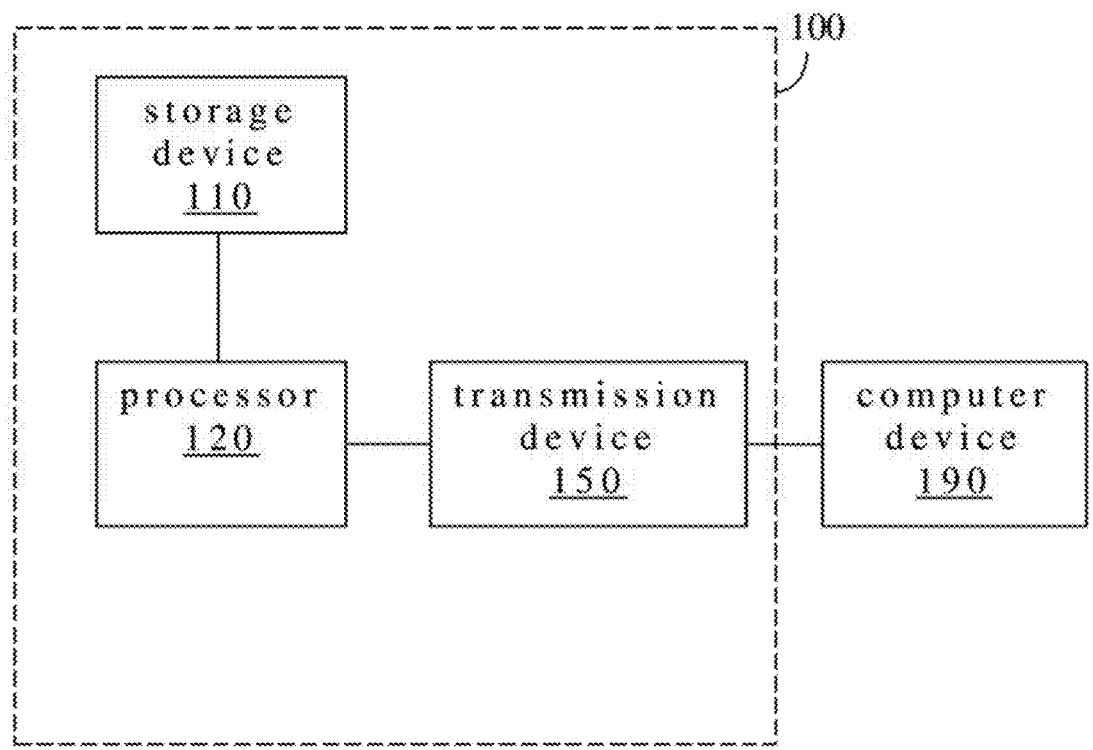
FIG. 1 is a block diagram of a functional metadata system for a data quality inspection according to some embodiments of the present disclosure.

Reference will now be made in detail to the present embodiments of the invention, examples of which are illustrated in the accompanying drawings. Wherever possible, the same reference numbers are used in the drawings and the description to refer to the same or like parts.

Referring to FIG. 1, in one aspect, the present disclosure is directed to a functional metadata system 100 for data quality inspection. The functional metadata system 100 for the data quality inspection may be easily integrated into data governance and may be applicable or readily adaptable to all technologies. In some embodiments of the present disclosure, the data governance refers to a set of practices, strategies, and roles related to collecting, managing, and utilizing data, with the purpose of ensuring that data provides as much value as possible in the organization. Technical advantages are generally achieved by the functional metadata system 100 for the data quality inspection according to embodiments of the present disclosure. Herewith the functional metadata system 100 for the data quality inspection is described below with FIG. 1.

The subject disclosure provides the functional metadata system 100 for the data quality inspection in accordance with the subject technology. Various aspects of the present technology are described with reference to the drawings. In the following description, for purposes of explanation, numerous specific details are set forth in order to provide a thorough understanding of one or more aspects. It can be evident, however, that the present technology can be practiced without these specific details. In other instances, well-known structures and devices are shown in block diagram form in order to facilitate describing these aspects. The word "exemplary" is used herein to mean "serving as an example, instance, or illustration." Any embodiment described herein as "exemplary" is not necessarily to be construed as preferred or advantageous over other embodiments.

FIG. 1 is a block diagram of the functional metadata system 100 for the data quality inspection according to some embodiments of the present disclosure. As shown in FIG. 1, the functional metadata system 100 for the data quality inspection includes a storage device 110, a processor 120 and a transmission device 150. For example, the storage device 110 can be a hard disk, a flash memory or another storage media, the processor 120 can be a central processor, a controller or another circuit, and the transmission device 150 can be a transmission interface, a transmission line, a network device, a communication device or another transmission medium.

In structure, the storage device 110 is electrically connected to the processor 120, the processor 120 is electrically connected to the transmission device 150, and the data transmission can be established between the transmission device 150 and a computer device 190. In practice, for example, the computer device 190 can be a personal computer, a mobile phone, an input/output device or another electronic device. It should be noted that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. For example, the storage device 110 may be a built-in storage device that is directly connected to the processor 120, or the storage device 110 may be an external storage device that is indirectly connected to the processor 120 through the wires.

In practice, for example, computer device 190 inputs data content. In use, the transmission device 150 receives the data content, and the storage device 110 stores the data content. The processor 120 performs the data quality inspection on the data content to obtain a detection result. In some embodiments of the present disclosure, the data quality inspection is selected from a group consisting of a detection of an acceptable pattern, a detection of a data distribution and a detection of a data definition.

Regarding the detection of the acceptable pattern, in some embodiments of the present disclosure, the data content includes string content, and the processor 120 detects whether a format of the string content matches the acceptable pattern (e.g., a preset computer-readable pattern). In practice, for example, the string content can contain 2012Q1, and its format represents the AD (Anno Domini) year and quarter. When the acceptable pattern includes ^(20\d{2}(Q[1-4]))$, the processor 120 determines the string The format of content matches the acceptable pattern.

Alternatively or additionally, in practice, for example, the string content may include 20120101, and its format represents the year, month, and day of the Gregorian calendar. When the acceptable pattern includes YYYYMMDD, the processor 120 determines that the format of the string content matches the acceptable pattern.

Regarding the detection of the data distribution, in some embodiments of the present disclosure, the data content includes numeric content, and the processor 120 performs the data distribution based on a historical data so as to define a default reasonable range for the numeric content. In practice, for example, the largest of multiple maximum values of multiple historically numeric data of the same type is used as an upper limit value, and the smallest of multiple minimum values of multiple historically numeric data of the same type is used as a lower limit value. The interval between the upper limit value and the lower limit value is defined as the default reasonable range. When the numeric content of the same type is within the default reasonable range, the processor 120 determines that the numeric content is normal; conversely, when the numeric content of the same type is outside the default reasonable range, the processor 120 determines that the numeric content is abnormal.

Regarding the detection of the data definition, in some embodiments of the present disclosure, the data content includes string content, and the processor 120 determines whether the string content matches a predefined attribute in the data definition. In practice, for example, steel, cement and partitions can be grouped into a material group. Although there is currently no other material data in the material group, when there is new data (e.g., the string content), and when the string content matches the predefined attribute of the material group that is predefined in the data definition, the processor 120 can determine that the string content is reasonable content.

Regarding the detection of the data definition, in some embodiments of the present disclosure, the data content includes numeric content, and the processor 120 determines whether the numeric content is abnormal based on a default common sense standard. In practice, for example, the processor 120 can automatically preset the upper limit of the room temperature to 50 degrees Celsius. When the numeric content represents that the room temperature is greater than 50 degrees Celsius, the processor 120 determines that the numeric content is abnormal.

Figure 2:
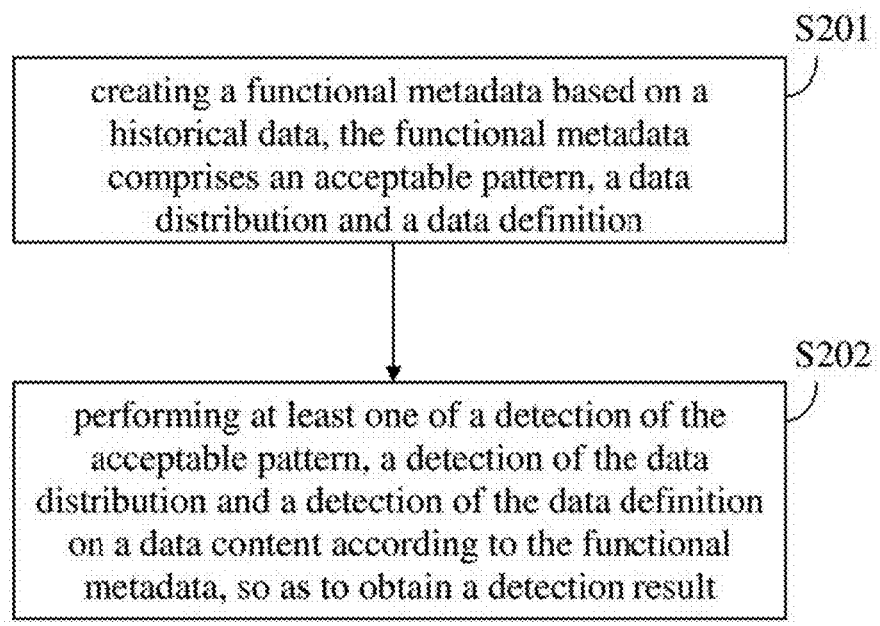
FIG. 2 is a flow chart of a functional metadata method for the data quality inspection according to some embodiments of the present disclosure.

For a more complete understanding of an operation method of the functional metadata system 100 for the data quality inspection, referring FIGS. 1-2, FIG. 2 is a flow chart of the functional metadata method 200 for the data quality inspection according to some embodiments of the present disclosure. As shown in FIG. 2, the functional metadata method 200 for the data quality inspection includes operations S201 and S202. However, as could be appreciated by persons having ordinary skill in the art, for the steps described in the present embodiment, the sequence in which these steps are performed, unless explicitly stated otherwise, can be altered depending on actual needs; in certain cases, all or some of these steps can be performed concurrently.

The functional metadata method 200 for the data quality inspection may take the form of a computer program product on a computer-readable storage medium having computer-readable instructions embodied in the medium. Any suitable storage medium may be used including non-volatile memory such as read only memory (ROM), programmable read only memory (PROM), erasable programmable read only memory (EPROM), and electrically erasable programmable read only memory (EEPROM) devices; volatile memory such as SRAM, DRAM, and DDR-RAM; optical storage devices such as CD-ROMs and DVD-ROMs; and magnetic storage devices such as hard disk drives and floppy disk drives.

In step S201, the processor 120 is based on historical data to create a functional metadata, where the functional metadata comprises an acceptable pattern, a data distribution and a data definition. In step S202, the processor 120 perform at least one of a detection of the acceptable pattern, a detection of the data distribution and a detection of the data definition on a data content according to the functional metadata to, so as to obtain a detection result.

Regarding the detection of the acceptable pattern, in some embodiments of the present disclosure, the data content includes string content, and in step S202, a format of the string content is analyzed through an artificial intelligence model, and then it is detected whether the format of the string content matches the acceptable pattern.

In practice, for example, the artificial intelligence model can be a built-in artificial intelligence model (e.g., a trained neural network model, a natural language processing model, etc.), and the storage device 110 stores the artificial intelligence model. In step S202, the processor 120 executes the built-in artificial intelligence model to analyze the format of string content, and then detects whether the format of string content matches the acceptable pattern.

Alternatively or additionally, the artificial intelligence model can be an external artificial intelligence model (e.g., ChatGPT, etc.). In step S202, the processor 120 analyzes the format of the string content through the transmission device 150 via the external artificial intelligence model, and then detects whether the format of string content matches the acceptable pattern. In practice, for example, the string content may include F-FLOZEN, and its format represents "English alphabet-English alphabet". When the acceptable pattern includes ^[A-Z]+-[A-Z]+$, the processor 120 determines the string content format matches acceptable pattern.

Regarding the detection of the data distribution, in some embodiments of the present disclosure, the data content includes numeric content, and in step S202, a data fitting is performed on the historical data in advance to obtain a probability distribution of the historical data so as to analyze whether the numeric content is an abnormal value. In practice, for example, processor 120 can execute the python package called fitter to implement data fitting. The processor 120 sets the value corresponding to a probability lower than a preset standard (e.g., an extremely low probability that can be excluded in practice) as a threshold to determine whether numeric content is abnormal value.

Regarding the detection of the above data definition, in some embodiments of the present disclosure, the data content includes string content, and in step S202, it is determined whether the string content is possible content. In practice, for example, the processor 120 determines whether the string content matches the predefined attribute in the data definition.

It should be noted that "possible content" is similar to "acceptable pattern", but a little different. The string content in some columns cannot be formatted by the method of the acceptable pattern above. For example, the database stored by storage device 110 has a column named "destination". The actual goods may be transported a new place in a certain country. The processor 120 determines whether the string content (e.g., a new place) matches the predefined attribute (e.g., a certain country) in the data definition, thereby automatically determining that the new location is also in a certain country, so there is no need to manually add the default standard answer to update.

In addition, regarding the detection of the data definition, in some embodiments of the present disclosure, in step S202, when the format of the string content does not match the acceptable pattern, using the artificial intelligence model to determine whether the format of the string content conforms to the default standard answer of the data definition, as a basis of confirming a correctness of the string content. In practice, for example, when the string content is CZO2, the processor 120 asks the artificial intelligence model: "Is CZO2 in the same format of UM08, CZO1, TP05, etc. and its data definition is the factory code?" When the artificial intelligence model replies the content that is reflected as yes, the processor 120 determines that the string content (CZO2) is correct.

Regarding the detection of the above data definition, in some embodiments of the present disclosure, the data content includes a numeric content, and in step S202, a predetermined numerical boundary (e.g., a maximum 300 km/h in speed column) of a default category (e.g., ordinary vehicles) is defined based on a default common sense standard; and when the numeric content belongs to the default category, it is determined whether the numeric content exceeds the predetermined numerical boundary, so as to eliminate some unreasonable values, such as Celsius temperature or speed, because these values have rationalized values based on common sense.

Regarding the above detection result, in some embodiments of the present disclosure, the detection result can include four commonly used data quality indicators: missing, redundant, inconsistent and outlier. In practice, for example, the standard value range of each indicator is ranged from 0 to 1, with 0 indicating that there is no problem and 1 indicating that relevant problems are detected in all columns. Compared with conventional data management, through the functional metadata system 100 for the data quality inspection and the functional metadata method 200 for the data quality inspection, above quality indicators are improved, especially the "inconsistency" and "quality" categories, the effect is particularly significant.

In view of the above, technical advantages are generally achieved, by embodiments of the present disclosure. Through the functional metadata system 100 for the data quality inspection and the functional metadata method 200 for the data quality inspection of the present disclosure, the problems and disadvantages in the conventional art are solved, thereby reducing the possibility of errors and saving time and manual inspection costs.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A functional metadata system for a data quality inspection, comprising:
a storage device configured to store a data content; and
a processor electrically connected to the storage device, the processor configured to perform the data quality inspection on the data content to obtain a detection result, and the data quality inspection selected from a group consisting of a detection of an acceptable pattern, a detection of a data distribution and a detection of a data definition, wherein the data content comprises a string content, wherein the processor detects whether a format of the string content matches the acceptable pattern, wherein when the format of the string content does not match the acceptable pattern, the processor uses an artificial intelligence model to determine whether the format of the string content conforms to a default standard answer of the data definition, as a basis of confirming a correctness of the string content.

2. The functional metadata system for the data quality inspection of claim 1, wherein the data content comprises a numeric content, and the processor performs the data distribution based on a historical data so as to define a default reasonable range for the numeric content.

3. The functional metadata system for the data quality inspection of claim 1, wherein the data content comprises the string content, and the processor determines whether the string content matches a predefined attribute in the data definition.

4. The functional metadata system for the data quality inspection of claim 1, wherein the data content comprises a numeric content, and the processor determines whether the numeric content is abnormal based on a default common sense standard.

5. A functional metadata method for a data quality inspection, comprising steps of:
creating a functional metadata based on a historical data, the functional metadata comprises an acceptable pattern, a data distribution and a data definition; and
performing at least one of a detection of the acceptable pattern, a detection of the data distribution and a detection of the data definition on a data content according to the functional metadata, so as to obtain a detection result, wherein the data content comprises a string content, where the step of performing the detection of the acceptable pattern on the data content comprises:
analyzing a format of the string content through an artificial intelligence model, and then detecting whether the format of the string content matches the acceptable pattern; and
when the format of the string content does not match the acceptable pattern, using the artificial intelligence model to determine whether the format of the string content conforms to a default standard answer of the data definition, as a basis of confirming a correctness of the string content.

6. The functional metadata method for the data quality inspection of claim 5, wherein the data content comprises a numeric content, and the step of performing the detection of the data distribution on the data content comprises:
performing a data fitting on the historical data in advance to obtain a probability distribution of the historical data so as to analyze whether the numeric content is an abnormal value.

7. The functional metadata method for the data quality inspection of claim 5, wherein the data content comprises a numeric content, and the step of performing the detection of the data definition on the data content comprises:
defining a predetermined numerical boundary of a default category based on a default common sense standard; and
when the numeric content belongs to the default category, determining whether the numeric content exceeds the predetermined numerical boundary.

* * * * *